United States Patent
Porte et al.

(10) Patent No.: US 12,054,275 B2
(45) Date of Patent: Aug. 6, 2024

(54) RESISTIVE SKIN SHELL INCORPORATING PERFORATED METAL BANDS, AND ACOUSTIC INNER WALL OF AN AIRCRAFT AIR INTAKE FORMED FROM SUCH RESISTIVE SKIN SHELLS

(71) Applicant: Airbus Operations SAS, Toulouse (FR)

(72) Inventors: Alain Porte, Toulouse (FR); Jacques Lalane, Toulouse (FR); François Pons, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 219 days.

(21) Appl. No.: 17/532,830

(22) Filed: Nov. 22, 2021

(65) Prior Publication Data

US 2022/0161939 A1     May 26, 2022

(30) Foreign Application Priority Data

Nov. 24, 2020   (FR) ...................................... 2012070

(51) Int. Cl.
  *B64D 33/02*   (2006.01)
  *B64D 29/00*   (2006.01)
  *G10K 11/162*  (2006.01)

(52) U.S. Cl.
  CPC ............. *B64D 33/02* (2013.01); *B64D 29/00* (2013.01); *G10K 11/162* (2013.01); *B64D 2033/0206* (2013.01)

(58) Field of Classification Search
  CPC .......... F01N 13/007; F02C 7/24; F02C 7/045; F02M 35/00; F02M 35/12;
  (Continued)

(56) References Cited

U.S. PATENT DOCUMENTS 2,870,857 A * 1/1959 Goldstein ................. E04B 9/32
                                                     428/116
4,104,002 A   8/1978 Ehrich
(Continued)

FOREIGN PATENT DOCUMENTS

DE   102013010091 A1   12/2014
FR        2838860 A1   10/2003

OTHER PUBLICATIONS

French Search Report; priority document.

*Primary Examiner* — Dedei K Hammond
*Assistant Examiner* — Joseph James Peter Illicete
(74) *Attorney, Agent, or Firm* — Greer, Burns & Crain, Ltd.

(57) ABSTRACT

A resistive skin shell for an acoustic panel or inner wall of an aircraft air intake, comprising an alternation, in a transverse direction, of perforated metal bands and of composite solid bands extending in a longitudinal direction. The perforated metal bands and the composite solid bands form a smooth outer face configured to be in contact with an aerodynamic stream, and a crenelated inner face. The composite solid bands have a thickness greater than the perforated metal bands. Since the perforations are provided in metal bands, which are intrinsically resistant to wear and erosion, the future proofing of the acoustic performance of the resistive skin is guaranteed. Since the composite solid bands, which are thicker, can ensure the mechanical strength of the skin, the thickness of the perforated metal bands can be reduced, allowing perforations with dimensions that are also reduced, having a lower impact on drag.

16 Claims, 5 Drawing Sheets

(58) Field of Classification Search
CPC .......... F05D 2250/283; F05D 2260/96; G10K 11/00; G10K 11/16; G10K 11/178; B29D 24/007; B29C 70/88; B21D 47/00; B64D 33/02; B64D 2033/0206; B64D 2033/0233; Y02T 50/672
USPC ........... 181/292, 290, 284; 244/1 N; 415/119
See application file for complete search history.

(56) References Cited

U.S. PATENT DOCUMENTS

| | | | |
|---|---|---|---|
| 8,820,477 B1* | 9/2014 | Herrera | G10K 11/168 |
| | | | 181/292 |
| 10,040,535 B2* | 8/2018 | Futatsugi | G10K 11/172 |
| 10,443,496 B2* | 10/2019 | Herrera | B32B 27/065 |
| 10,793,282 B2* | 10/2020 | VanDeMark | G10K 11/172 |
| 11,047,304 B2* | 6/2021 | Lin | B33Y 80/00 |
| 11,434,819 B2* | 9/2022 | Murugappan | F04D 29/664 |
| 2004/0016595 A1 | 1/2004 | Andre et al. | |
| 2005/0081992 A1 | 4/2005 | Buge et al. | |
| 2018/0304987 A1* | 10/2018 | Porte | B64C 1/40 |
| 2019/0039746 A1 | 2/2019 | Brooks et al. | |

* cited by examiner

RESISTIVE SKIN SHELL INCORPORATING PERFORATED METAL BANDS, AND ACOUSTIC INNER WALL OF AN AIRCRAFT AIR INTAKE FORMED FROM SUCH RESISTIVE SKIN SHELLS

CROSS-REFERENCES TO RELATED APPLICATIONS

This application claims the benefit of the French patent application No. 2012070 filed on Nov. 24, 2020, the entire disclosures of which are incorporated herein by way of reference.

FIELD OF THE INVENTION

The present application relates to a resistive skin shell for the production of an acoustic wall. It relates more particularly to the resistive skin shells (or segments) and the acoustic wall which delimit the central duct of the air intake of an aircraft nacelle.

BACKGROUND OF THE INVENTION

It is recalled that an aircraft nacelle comprises, from front to rear, a first section upstream of the aerodynamic stream, called air intake, a second section which covers the casing of the engine fan, called fan cowl, and a third section which generally has a thrust reversal zone which surrounds the turbine body of the engine downstream of the aerodynamic stream.

An air intake, such as that illustrated in the attached FIG. 2, normally comprises structural elements such as a front frame 101 and a rear frame 104, as well as, from front to rear of the nacelle, a lip 100 formed by the front frame, outer panels 102 extending the lip outside of the nacelle (and forming an outer wall of the air intake), an inner wall 103 extending the lip inside the nacelle and delimiting a central duct allowing the air to be channeled towards the engine, the outer panels and the inner wall being borne by the front frame 101 and the rear frame 104.

The form of the air intake and the systems with which it is equipped need to make it possible to avoid the formation and/or the build-up of ice or frost, ensure an aerodynamic function, prevent birds from penetrating into the fan compartment containing the engine systems, and limit the impact of sound nuisance. To fulfil this last objective, the inner wall 103 is an acoustic wall which comprises:
- a perforated or microperforated resistive skin which forms the visible face of the wall (face oriented towards the interior of the central duct of the air intake);
  the aim of this resistive skin is to allow the passage of the sound waves and possibly also at least partially dissipate the energy thereof in thermal form,
- a rear skin whose essential function is to ensure the structural strength of the wall,
- a cellular damping core, generally in honeycomb form, on either side of which the resistive skin and the rear skin are fixed, which core contributes both to the mechanical strength and to the acoustic damping, the main function of the core being to capture and dampen the sound waves.

As is known, the resistive skin of the inner wall of the air intake can be composed of several (for example four to ten) resistive skin segments corresponding to angular segments of the central duct of the air intake, as illustrated in FIG. 2. The same applies for the rear skin of the inner wall. Each resistive skin segment is fixed to the front 101 and rear 104 frames. The different segments are also fixed to one another using fishplates.

Each resistive skin segment is a rigid shell made of a composite material based on fibers (carbon or glass for example) and polymerizable resin. This composite shell can be obtained by molding using a three-dimensional mold, by fiber and resin injection, or by the overinjection of resin or fibers and resin onto plies or fabrics. The form of the segment is then directly given by the mold, at the time of polymerization of the resin. In a variant, the resistive skin segment can be molded flat, in two dimensions, then be subjected to a forming operation which gives it its complex form. As previously explained, the resistive skin of an acoustic wall, in particular an inner wall of an air intake, must allow the acoustic waves to pass. Orifices, generally of circular form, are therefore drilled in the rigid shells made of composite material to form resistive skin segments.

An example of acoustic panel comprising a multilayer resistive skin shell is described in FR 2 838 860.

The acoustic specifications of a resistive skin shell depend, among other things, on the open surface ratio (TSO) of the skin, that is to say, the surface area of orifices per unit of skin surface.

The specifications (acoustic, mechanical, thermal, etc.) of the known earlier resistive skins are, for some, satisfactory. However, it is always desirable to improve the acoustic performance of the known resistive skins and guarantee that such acoustic performance is not degraded over time, throughout the life of the nacelle.

SUMMARY OF THE INVENTION

The invention aims to achieve this objective by proposing a resistive skin shell for an acoustic panel or inner wall of an aircraft air intake which is more resistant to stripping and to wear and whose open surface ratio is guaranteed for the duration.

To do this, the invention proposes a resistive skin shell for an acoustic panel or inner wall of an aircraft air intake, characterized in that it comprises perforated metal bands which extend in a longitudinal direction and are spaced apart from one another in a transverse direction (direction orthogonal to the longitudinal direction), the perforated metal bands having a front-end face, called outer face, intended to be in contact with an aerodynamic stream, and an opposite front-end face called inner face, the perforated metal bands being linked to one another by composite solid bands made of a fiber-reinforced polymer material, which composite solid bands have an outer front-end face flush with the outer faces of the perforated metal bands, such that the resistive skin shell has a smooth outer face, the composite solid bands having, in addition, a thickness greater than that of the perforated metal bands, such that the composite solid bands have an inner face that is raised with respect to the inner face of the perforated metal bands.

Throughout the application, the expression "perforated metal band" designates a metal band provided with perforations or micro perforations for the passage of acoustic waves, that is to say, holes whose dimensions can be either of the order of a millimeter (perforations), or of the order of a micrometer or at the very least ten or a hundred or so micrometers (micro perforations).

According to the invention, as defined above, the perforations or micro perforations of the resistive skin shell are therefore situated in metal bands, and only therein, unlike, in the known earlier skins like that disclosed by FR 2 838 860, the orifices formed in layers of composite material. The metal bands used according to the invention erode less easily than the composite layers of earlier resistive skins, and the risks of the TSO of its metal bands increasing by stripping of material in the continuity of the perforations is reduced.

The resistive skin according to the invention consequently offers future-proof acoustic performance while having, by virtue of the presence of reinforced composite solid bands between the perforated metal bands, a mechanical strength suited to its use for the production of an inner wall of an aircraft air intake, which is subject to great mechanical stresses. The thickness of the composite solid bands can, in fact, be chosen as a function of the mechanical specifics desired for the resistive skin shell.

Furthermore, the fact that the perforations are provided in metal bands, whose thickness is lesser, makes it possible, not only to guarantee a low erosion of the perforations (because of the nature of the bands), but also provide perforations of smaller dimensions (because of the low thickness of the bands), that is to say, perforations or micro perforations which have less impact on drag, and without the risk of these perforations or micro perforations becoming blocked (this risk being limited or even zero when the holes have a diameter greater than the thickness of the drilled layer).

To sum up, the invention therefore proposes a hybrid resistive skin shell, formed by an alternation (in the transverse direction) of perforated metal (longitudinal) bands which determine the acoustic properties of the skin and guarantee the future-proofing of these properties, and of composite solid (longitudinal) bands which essentially contribute to the mechanical strength of the skin.

According to a possible feature of the invention, the perforated metal bands have chamfered and/or irregular longitudinal edges configured to facilitate and/or reinforce the attachment, on the metal bands, of the fiber-reinforced composite polymer constituting the composite solid bands.

According to a possible feature of the invention, the metal bands have perforations or micro perforations that have a greater dimension in the longitudinal direction and/or a smaller dimension in the transverse direction. This feature makes it possible to limit the drag generated by the perforations or micro perforations. However, the invention is not limited to this configuration and the reverse is also possible.

According to a possible feature of the invention, the metal bands have oblong perforations or micro perforations, for example rectangular or elliptical.

These oblong perforations or micro perforations advantageously have a width of between 0.15 mm and 2 mm and a length of between 0.6 mm and 20 mm. If they are micro perforations, the width is preferentially between 0.15 mm and 0.5 mm, more preferentially between 0.3 mm and 0.4 mm; and the length is preferentially between 2 mm and 12 mm, more preferentially between 3 mm and 5 mm. If they are perforations, the width is preferentially between 1 mm and 2 mm, more preferentially between 1.5 mm and 2 mm; and the length is preferentially between 10 mm and 20 mm.

According to a possible feature of the invention, whether they be perforations or micro perforations (oblong), the ratio between the length and the width (length divided by width) of the perforations or micro perforations is advantageously greater than or equal to 2, preferentially between 2 (inclusive) and 10 (inclusive), more preferentially greater than or equal to 4 or between 4 (inclusive) and 10 (inclusive). Such a ratio makes it possible to obtain a significant drag reduction.

In an advantageous particular embodiment, the oblong micro perforations measure 0.3 mm by 1.8 mm. In another particular embodiment, the micro perforations are circular with a diameter of between 0.25 mm and 0.35 mm, preferentially of the order of 0.3 mm.

In the above two particular embodiments, the micro perforations can be obtained by electron beam drilling, and at a high rate of the order of 50 holes per second.

According to a possible feature of the invention, the perforated metal bands have a thickness of between 0.10 mm and 0.4 mm, preferably between 0.2 mm and 0.3 mm.

According to a possible feature of the invention, the composite solid bands have a thickness of between 0.3 mm and 0.6 mm, preferably between 0.4 mm and 0.5 mm.

According to a possible feature of the invention, the composite solid bands have a thickness greater by at most 0.2 mm than the thickness of the perforated metal bands.

According to a possible feature, the composite solids bands locally have variable thicknesses. In particular, the composite solid bands advantageously have a variable thickness in the longitudinal direction (X), that is to say, a thickness which can vary from one transverse plane (a transverse plane of the shell corresponding to an orbital plane of the air intake) to another. Thus, for example, it is advantageous to provide, for all or at least one of the composite solid bands, a band thickness that is locally greater (compared to the thickness of the rest of the band) in at least one transverse plane (or orbital plane). In other words, the composite solid bands have, in one or more transverse planes, an over thickness which, in the inner wall of the air intake, forms one or more low orbital walls that can slow down, even totally avoid, any recirculation of air along the air intake. Given the pressure differences that exist in the longitudinal direction X in the air intake, the air can penetrate into the inner wall of the air intake at one point of the air intake and reemerge from the inner wall at another point of the air intake, more downstream for example; air recirculation phenomena can thus be generated by the pressure differences that prevail along the air intake. The low orbital walls created in the composite solid bands make it possible to slow down or avoid such phenomena.

According to a possible feature, the composite solid bands are made of a composite material formed by molding or overmolding, injection or overinjection of pure resin or of resin with added fibers. The overmolding, injection or overinjection make it possible to industrially produce shells in which the composite solid bands can locally have a greater thickness in certain transverse planes. These methods offer a capacity for local adaptation, and do so without penalizing the overall industrial means.

According to a possible feature of the invention, the perforated metal bands are made of a material chosen from among stainless steels, titanium, etc., and alloys of the above materials.

According to a possible feature of the invention, the composite solid bands are made of a composite material based on fibers chosen from among carbon fibers, glass fibers, Kevlar, aramid fibers, etc., embedded in a polymer chosen from among the thermoplastic resins including the resins of the family of polyetheretherketones (PEEK) and the resins of the family of polyetherimides (PEI).

The invention extends to an inner wall of an aircraft air intake comprising a resistive skin configured to allow acoustic waves to pass, a cellular core configured to dampen the acoustic waves and a structural rear skin, characterized in that the resistive skin of the inner wall is composed of resistive skin shells according to the invention, the longitudinal direction of the resistive skin shells being parallel to the central axis, or axial direction, of the air intake.

According to a possible feature, the inner wall of the air intake comprises also, between the resistive skin and the cellular core, a winding composed either of a plurality of composite solid bands extending in transverse planes all around the central duct and spaced apart from one another in the axial direction of the air intake, or a single helical composite solid band wound around the duct.

The invention extends to an aircraft nacelle comprising an air intake having an inner wall according to the invention. It extends also to a propulsion assembly equipped with such a nacelle, and to an aircraft comprising at least one propulsive assembly thus equipped.

BRIEF DESCRIPTION OF THE DRAWINGS

The invention, according to an exemplary embodiment, will be well understood and its advantages will become more apparent on reading the following detailed description, given in an indicative and nonlimiting manner, with reference to the attached drawings in which.

The elements that are identical represented in the above-mentioned figures are identified by identical numeric references.

DETAILED DESCRIPTION OF THE PREFERRED EMBODIMENTS

Figure 1:
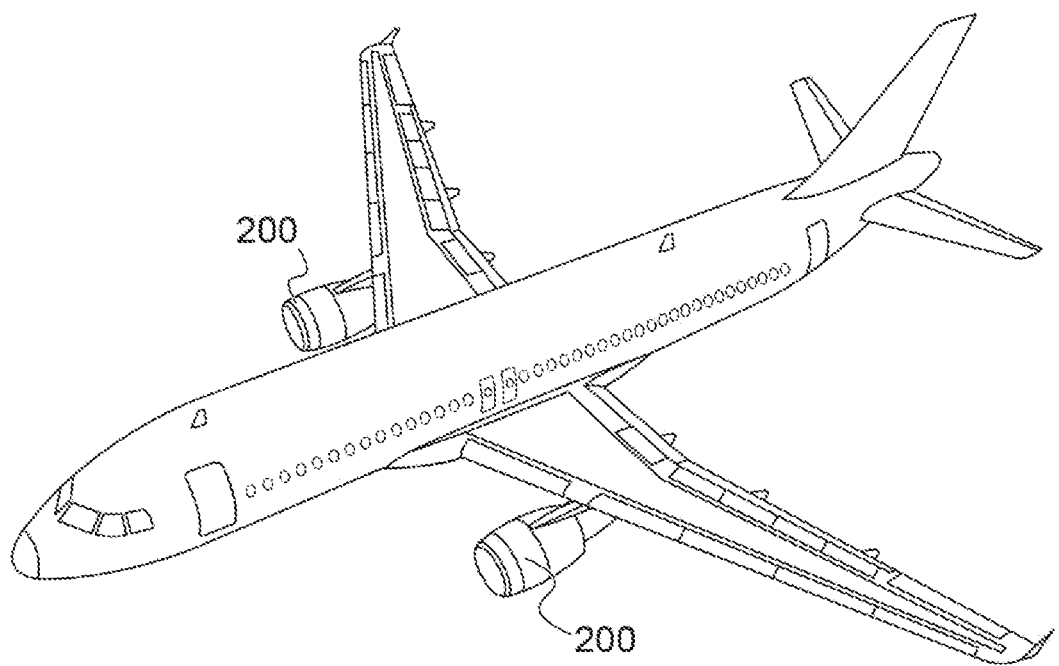
FIG. 1 is a perspective view of an aircraft.
Figure 2:
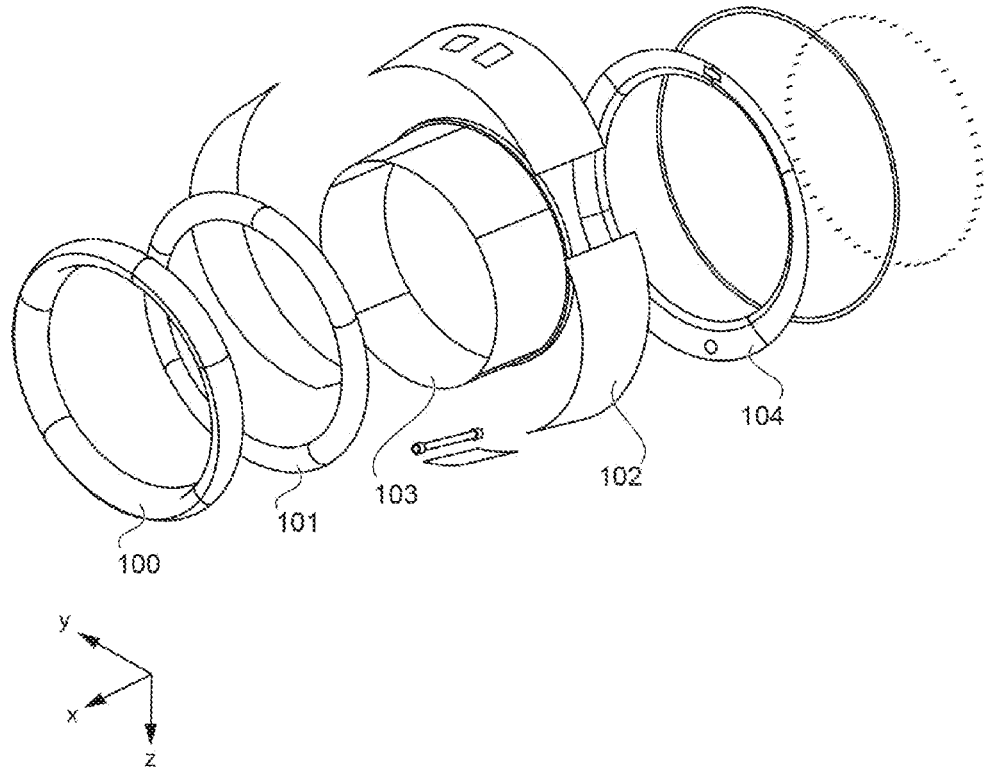
FIG. 2 is an exploded perspective view of an air intake of the prior art, but which could be produced with resistive skin shells according to the invention.

FIG. 1 shows a twin-engine aircraft of which the two nacelles 200 have an air intake with a resistive skin produced from resistive skin shells according to the invention.

Figure 3:
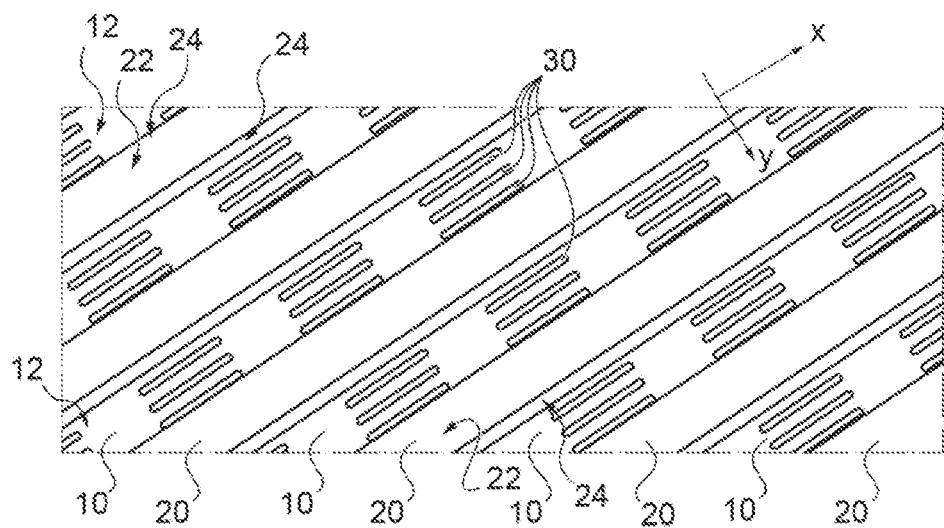
FIG. 3 is a perspective view of the inner front-end face of a first embodiment of a resistive skin shell according to the invention.
Figure 4:
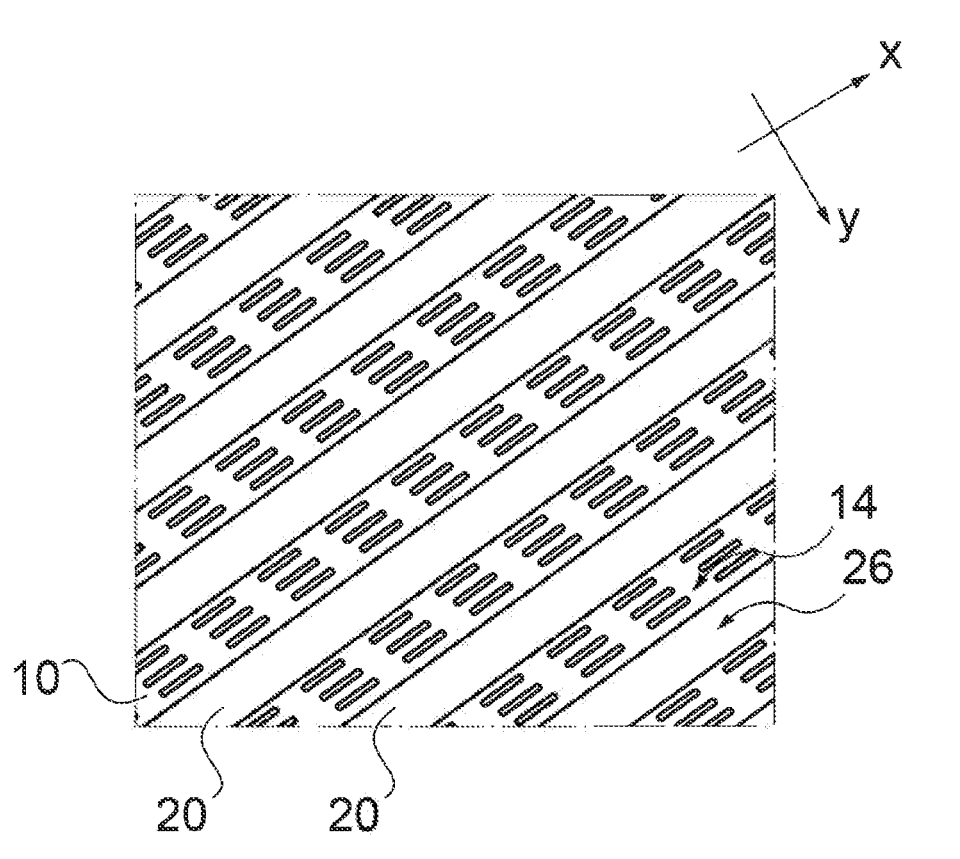
FIG. 4 is a perspective view of the outer front-end face of the resistive skin shell of FIG. 3.
Figure 5:
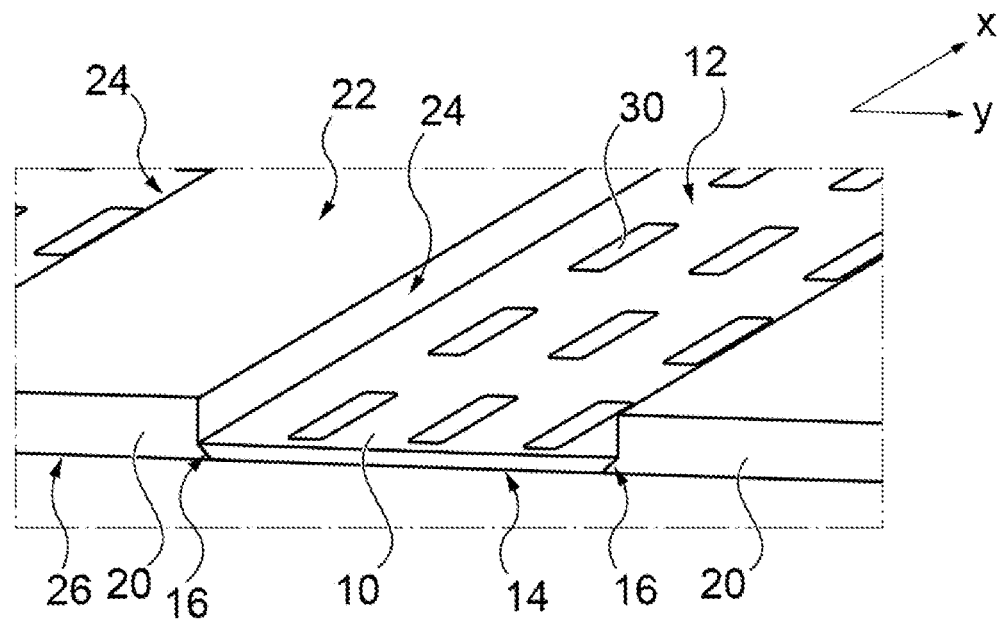
FIG. 5 is a perspective and cross-sectional view of the resistive skin shell of FIGS. 3 and 4.

FIGS. 3 to 5 represent a first embodiment of a resistive skin shell according to the invention. Only a part of the shell is visible in these figures.

This resistive skin shell comprises perforated metal bands 10, that is to say, metal bands provided with perforations or micro perforations 30. These perforated metal bands 10 extend in a longitudinal direction X of the shell and are spaced apart from one another in a transverse direction Y.

Between two successive perforated metal bands 10 there extends a composite solid band 20 which adheres to the two metal bands and secures them. The composite solid bands 20 can be made of a composite material based on carbon fibers and PEI resin for example.

The composite bands are preferably obtained by overmolding of the metal bands in a 3D mold that has the form of the resistive skin shell to be produced.

The metal bands have a first front-end face 14 (visible in FIG. 4), qualified as outer face because it is intended to form the visible face of the central duct of an aircraft air intake, that is to say, the outer face of the inner wall of the air intake.

The metal bands have an opposite front-end face 12 (visible in FIGS. 3 and 5), qualified as inner face 12 because it is intended to be situated inside the inner wall of the air intake, against a cellular core (honeycomb core for example, not represented). Likewise, the composite solid bands comprise an outer front-end face 26 (visible in FIG. 4) and an inner front-end face 22 (visible in FIGS. 3 and 5).

The outer front-end faces 14 and 26, respectively of the metal bands and of the composite solid bands, extend in the same plane or the same domed surface, that is to say, the outer face 14 of each perforated metal band 10 is flush with the surface of the outer front-end faces 26 of the two composite solid bands 10 which are adjacent to the perforated metal band, and, likewise, the outer face 26 of each composite solid band 20 is flush with the surface of the outer front-end faces 14 of the two perforated metal bands 10 which are adjacent to the composite solid band. The outer faces 14 and 26 of the perforated metal bands and of the composite solid bands thus form a smooth outer face for the inner wall of the air intake, as can be seen in FIG. 4.

Conversely, the inner front-end faces 22 of the composite solid bands extend overhanging with respect to the inner front-end faces 12 of the perforated metal bands 10, such that each composite solid band creates two shoulders 24 in the inner front-end face of the resistive skin shell. In other words, the inner face of the resistive skin shell exhibits an alternation of peaks and troughs extending longitudinally, formed respectively by the composite solid bands and the perforated metal bands. Preferably, the shoulders 24 do not exceed 0.2 mm in height.

By definition, each perforated metal band 10 comprises perforations or micro perforations 30. In this first embodiment, the perforations or micro perforations 30 are oblong or even rectangular, with a greater dimension (length) which extends in the longitudinal direction X and a smaller dimension (width) in the transverse direction Y, it being specified that the longitudinal direction X of the skin shell is intended to coincide with the axial direction of the air intake to be produced.

The perforated metal bands 10 have, for example, a thickness of 0.2 mm to 0.3 mm, and perforations 30 of which the width is between 0.3 mm and 0.4 mm and the length is between 3 mm and 4 mm. The composite solid bands 20 moreover have a thickness corresponding to two plies or more if necessary, for example between 0.4 mm and 0.5 mm, the difference in thickness between the composite bands and the metal bands being limited, preferably, to 0.2 mm From time to time, regularly or irregularly, for example with an interval of 25 to 100 mm in the transverse direction X, composite solid bands can have a height of the order of 40 mm to create low orbital walls slowing down or avoiding the recirculation of air in the air intake in the longitudinal direction X.

Moreover, in this first embodiment, each perforated metal band 10 has chamfered longitudinal edges on the side of the outer face 14 of the band. These chamfers 16 promote the attachment of the adjacent composite solid bands 20 to the perforated metal band 10. Two other chamfers, on the side of the inner face 12 of the metal band 10 could also be provided. As a variant or in combination, the troughs (longitudinal edges) of the metal bands can have irregularities, the purpose of which is likewise to reinforce the attachment between composite and metal bands.

Figure 6:
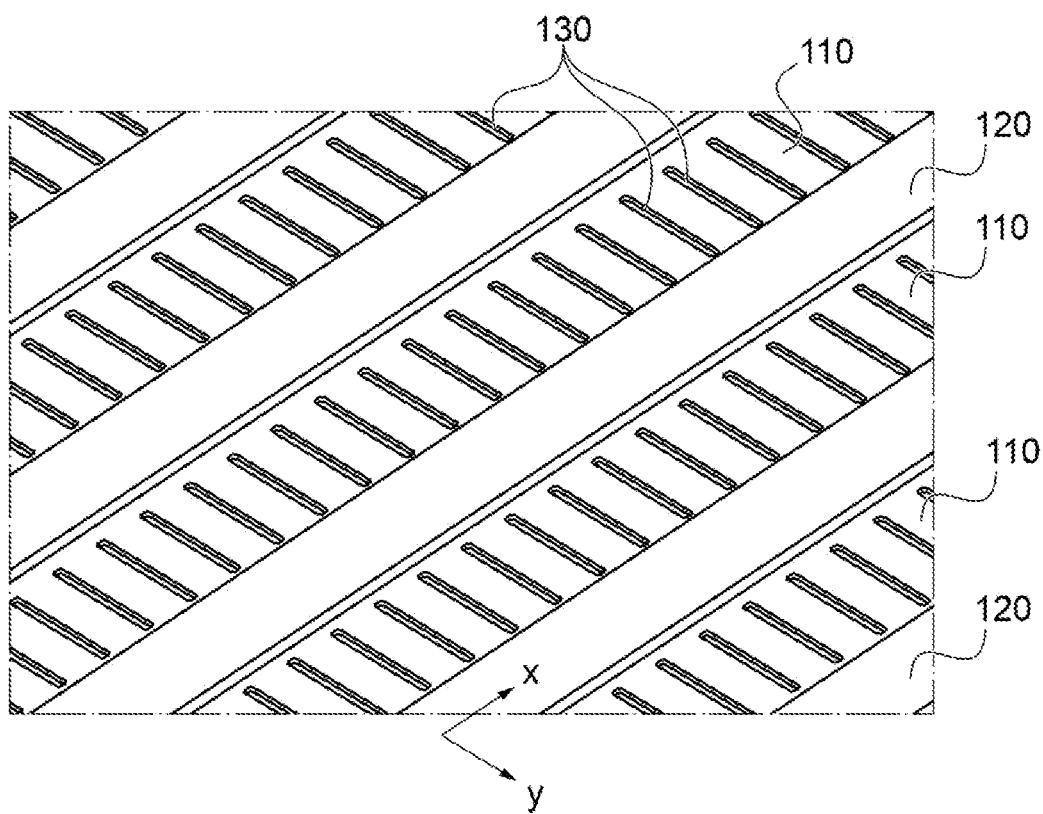
FIG. 6 is a perspective view of the inner front-end face of a second embodiment of a resistive skin shell according to the invention.

FIG. 6 illustrates a second embodiment. Like the first embodiment, this second embodiment comprises perforated metal bands 110 and composite solid bands 120 which extend mainly in the longitudinal direction X of the skin shell. On the other hand, this second embodiment differs from the first embodiment in that its metal bands 110 comprise oblong or rectangular perforations or micro perforations which extend mainly in the transverse direction Y (instead of X).

As previously, the composite solid bands 120 are obtained by overmolding of the metal bands 110 in a 3D mold, the thickness of fiber-reinforced composite material deposited between two perforated metal bands 110 being greater than the thickness of the metal bands.

Figure 7:
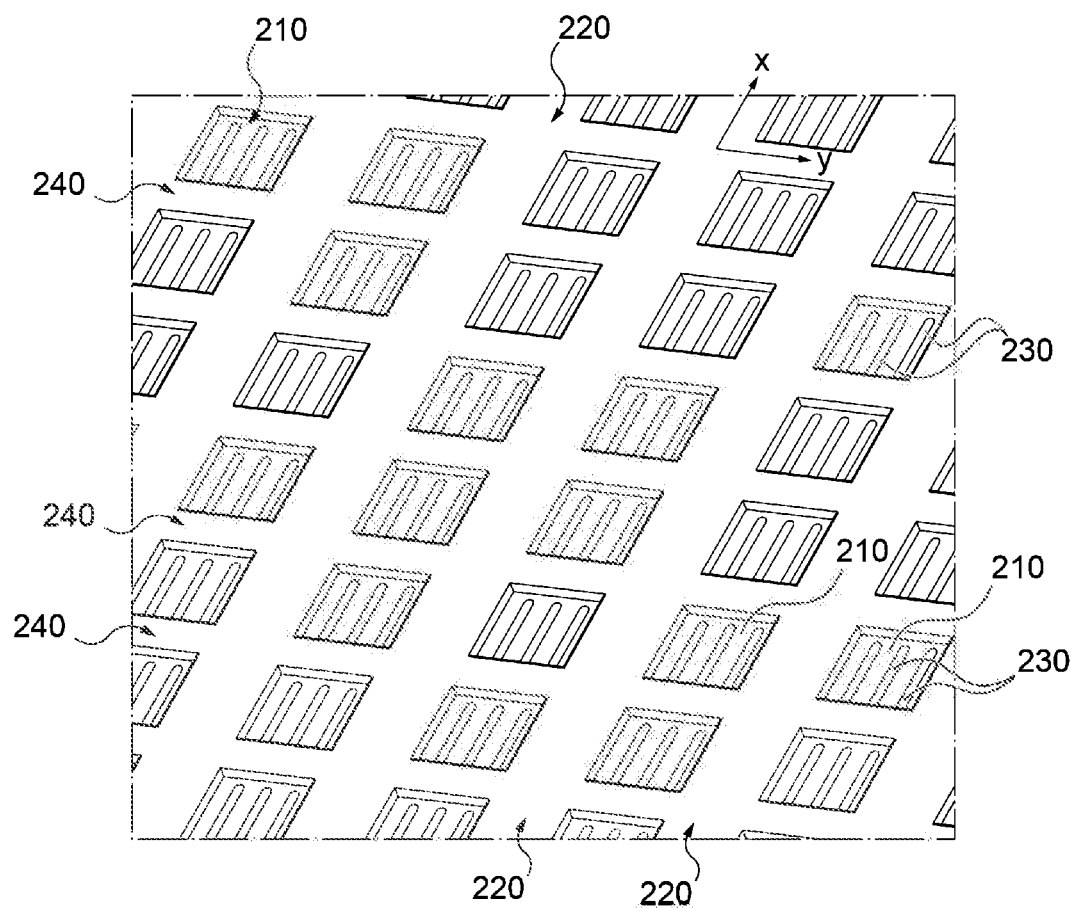
FIG. 7 is a perspective view of the inner front-end face of a third embodiment of a resistive skin shell according to the invention.

In the third embodiment, illustrated in FIG. 7, the composite material is injected not only between perforated metal bands 210 extending in the longitudinal direction X so as to obtain longitudinal solid bands 220, but also partly over the metal bands so as to obtain in addition transverse composite solid bands 240 (which extend in the transverse direction Y). The composite solid bands 220 and 240 therefore form a grid of over thickness of the metal bands 210 revealing perforated square (or possibly rectangular) zones.

The perforations or micro perforations 230 of the perforated metal bands (longitudinal) which are situated facing a transverse composite solid band 240 are filled by the injected composite material; as a variant, it is possible to provide metal bands without perforations in line with the transverse composite solid bands 240.

The set of composite bands 220, 240 assures the mechanical linking of the metal bands 210 together. Furthermore, the longitudinal composite solid bands 220 are intended to essentially absorb the axial forces to which the inner wall of the air intake is subjected, whereas the transverse composite solid bands 240 effectively absorb the orbital and radial forces.

The invention extends to an inner wall of an air intake comprising a plurality of resistive skin shells according to the invention, each shell corresponding, for example, to a segment of the air intake duct.

The inner wall additionally comprises a cellular core, for example composed of honeycomb panels, which are glued to the inner face of each skin shell, the docking of the cellular core on the inner face with a crosslinking film preferably compensating for the over thickness generated by the composite solid bands with respect to the perforated metal bands (this effect is obtained if the over thickness does not exceed 0.2 mm) The inner wall finally comprises a structural rear skin, which can be composed of one or more plies of fiber-reinforced polymer.

It is also possible to provide a winding between the resistive skin shells and the cellular core. This winding can take the form of a plurality of independent circular bands or of a helical band wound around the resistive skin shells. The height of the over thickness of the composite solid bands according to the invention must then be gauged taking into account the thickness of the winding.

The invention is not limited to these examples and extends to all the variants that fall within the scope of the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A resistive skin shell for an acoustic panel or inner wall of an aircraft air intake, comprising:
    perforated metal bands which extend in a longitudinal direction and are spaced apart from one another in a transverse direction, the metal bands each having a front-end outer face configured to be in contact with an aerodynamic stream which flows in the longitudinal direction, and an opposite front-end inner face, each metal band laterally delimited by longitudinally extending edges,
    wherein the metal bands are linked to one another by composite solid bands extending in the longitudinal direction, which composite solid bands are made of a fiber-reinforced polymer and have an outer front-end face flush with the outer faces of the perforated metal bands, wherein each perforated metal band is joined to a first composite solid band along a first longitudinally extending edge and to a second composite solid band along a second longitudinally extending edge, and
    a smooth outer face, the composite solid bands having, in addition, a greater thickness than that of the perforated metal bands, the composite solid bands consequently having an inner face that is raised with respect to the inner face of the perforated metal bands.

2. The resistive skin shell according to claim 1, wherein the perforated metal bands have at least one of chamfered or irregular longitudinal edges configured to at least one of facilitate or reinforce an attachment, to the metal bands, of the fiber-reinforced polymer constituting the composite solid bands.

3. The resistive skin shell according to claim 1, wherein the perforated metal bands have perforations or micro perforations that have at least one of a greater dimension in the longitudinal direction or a smaller dimension in the transverse direction.

4. The resistive skin shell according to claim 1, wherein the metal bands have oblong perforations or micro perforations.

5. The resistive skin shell according to claim 4, wherein the oblong micro perforations or perforations have a width of between 0.15 mm and 2 mm, and a length of between 0.6 mm and 20 mm.

6. The resistive skin shell according to claim 4, wherein a ratio between a length and a width of the perforations or micro perforations is between 2 and 10.

7. The resistive skin shell according to claim 1, wherein the metal bands have circular micro perforations with a diameter of between 0.25 mm and 0.35 mm.

8. The resistive skin shell according to claim 1,
    wherein the perforated metal bands have a thickness of between 0.1 mm and 0.4 mm, and
    wherein the composite solid bands have a thickness of between 0.3 mm and 0.6 mm.

9. The resistive skin shell according to claim 1, wherein the perforated metal bands are made of a metal material chosen from among the stainless steels, titanium and alloys of stainless steels and titanium.

10. The resistive skin shell according to claim 1, wherein the composite solid bands are made of a composite material comprising fibers chosen from the group consisting of carbon fibers, glass fibers, Kevlar, and aramid fibers, wherein the fibers are embedded in a polymer chosen from the group consisting of the resins of a family of polyether ether ketone and the resins of the family of polyetherimides.

11. The resistive skin shell according to claim 1, wherein the composite solid bands have a variable thickness in the longitudinal direction, with a locally greater thickness in at least one transverse plane.

12. An inner wall of an aircraft air intake comprising:
a resistive skin configured to allow the passage of acoustic waves,
a cellular core configured to dampen said acoustic waves, and
a structural rear skin,
wherein the resistive skin of the inner wall is composed of resistive skin shells according to claim 1, the longitudinal direction of the resistive skin shells being parallel to a central axis of the air intake.

13. The inner wall of an aircraft air intake according to claim 12, further comprising, between the resistive skin and the cellular core, a winding composed either of a plurality of composite solid bands extending in transverse planes all around a central duct formed by the resistive skin, and spaced apart from one another in the longitudinal direction, or a single helical composite solid band wound around said duct.

14. An aircraft nacelle comprising an air intake having an inner wall according to claim 12.

15. An aircraft propulsive assembly comprising a nacelle according to claim 14.

16. An aircraft comprising at least one propulsive assembly according to claim 15.

* * * * *